_United States Patent_ [19]

Tianchon

[11] 4,003,535
[45] Jan. 18, 1977

[54] MODULAR FURNITURE

[76] Inventor: Carmelito B. Tianchon, 4769 Guadalcanal St., Sta. Mesa, Manila, Philippines

[22] Filed: Sept. 29, 1975

[21] Appl. No.: 617,610

[30] Foreign Application Priority Data

July 10, 1975 Philippines .................. 17367

[52] U.S. Cl. .......................... 248/188; 297/445; 312/257 SK; 248/188.1; 403/364
[51] Int. Cl.² .............. F16M 11/16; A47B 57/08
[58] Field of Search ......... 52/753 A, 753 B, 753 D, 52/753 F, 753 T; 297/445, 440, 248; 312/263, 257 SK, 111; 211/176; 248/188.1

[56] References Cited
UNITED STATES PATENTS

| 238,491 | 3/1881 | Davis | 52/753 T |
|---|---|---|---|
| 3,402,963 | 9/1968 | Fujioka et al. | 297/248 |
| 3,692,340 | 9/1972 | Roth | 52/753 T |
| 3,744,868 | 7/1973 | Reiter | 312/263 |
| 3,912,087 | 10/1975 | Zeischegg | 52/753 D |

Primary Examiner—Casmir A. Nunberg
Attorney, Agent, or Firm—Sughrue, Rothwell, Mion, Zinn & Macpeak

[57] ABSTRACT

This invention relates to an extremely versatile low cost modular furniture basically employing a modular multi-purpose framework structurally designed introducing a novel corner assembly and a slanted finger joint for use therewith. Said framework consists of adjacent members each member being defined by a horizontal and a vertical portion and leg members diagonally secured in between said vertical portion thereon form a novel corner assembly. The joint used in said members is that of a slanted finger type. At the upper end of said leg member in between said adjacent members is formed with supporting means adapted to accommodate other related component parts of accessories that is in general loosely held in place on said framework to allow an instant formation of different kind of modular and convertible furniture piece and also, permits vertical stacking thereon. Hook members are provided on the face of said vertical portions, to permit horizontal joining. The positioning of said framework horizontally and vertically, plus the integration of other component and accessories enables a wide variety of combination and arrangement for sitting, sleeping, dining, storage, platform, merchandizing displayer or others.

7 Claims, 20 Drawing Figures

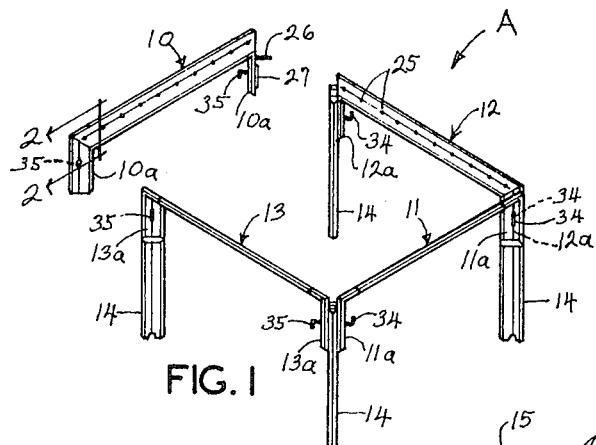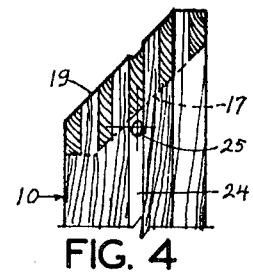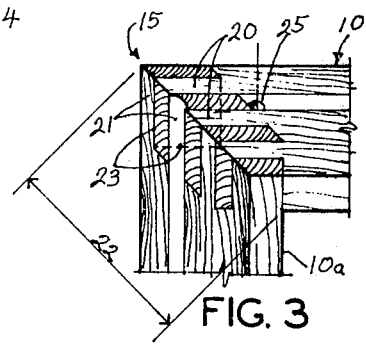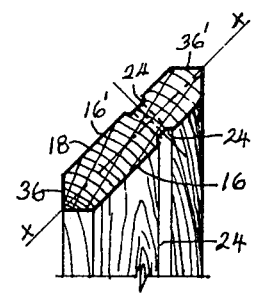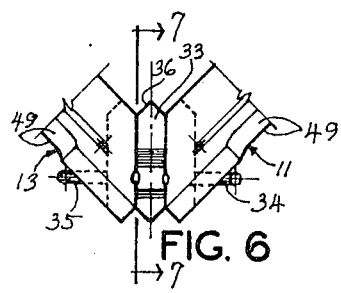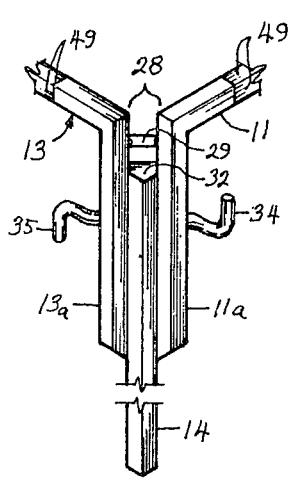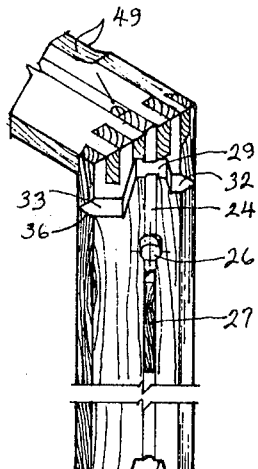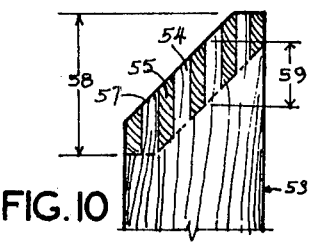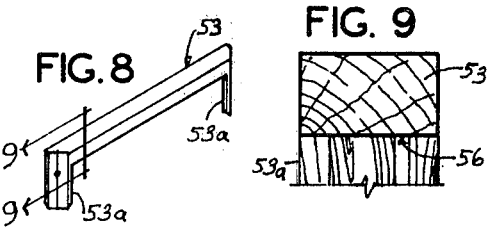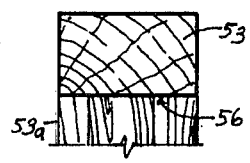

MODULAR FURNITURE

BACKGROUND OF THE INVENTION

This present invention relates in general to furniture construction but more particularly, it concerns with modular and convertible furniture, employing a modular multi-purpose framework structurally designed introducing a novel corner assembly and a slanted finger joint for use therewith.

Modular furniture is fast becoming the life style of modern countries. Its versatility uniqueness of design and cost lends itself to furnishing any apartment, home, office and other commerical or institutional building immediately and in good taste.

However, it was observed that these prior known designs have generally been subject to various difficulties. Some have been unduly complex and the excessive use of materials so that they become expensive and hard to move; others are difficult to assemble wherein it require extra fastener or clip to connect one element to another or even by the use of cumbersome tools and that it is hard to convert instantly for another desired function; and others of this type formed of wood have been of poor and ordinary structural design so that they are fragile and cannot take normal stresses, more to the fact, that in the design of low cost furniture the size of the structural members are comparably smaller.

Thus for specific example is a structural design formed of wood involving a corner assembly wherein a longitudinal member and adjacent transverse member are mounted on the topmost portion of the vertical member by means of mortise and tenon joint. Said joint is generally constructed with the vertical member provided with mortise or holes on its adjacent face wherein the reduced end or tenon of said longitudinal and transverse member is inserted forming thereon a unitary structure. The objection with this type of construction is that the joint is not strong enough and that it is fragile owing to the fact that the effective joint shoulder is very short, and the effective glueing area is comparably small. In the design of a low cost structure as mentioned above, said joint or corner assembly became structurally impractical. However, since a corner assembly is always encountered and that it is very convenient in furniture construction, several types of joint couple by using an extra size structural members has been continually used like: dowel joint, combination miter and half lap joint or even with the use of a metallic furniture fittings, but still no solution have been so successful that improves greatly the strength of the said corner assembly. Another example of ordinary structural design formed of wood is a widely used ordinary finger joint which is defined by interlocking end of the adjacent members, said member preferably rectangular in cross section laterally the wider face in contact of each member is positioned at right angle with respect to each other and being formed with a plurality of fingers that are cut in the material from which the member is formed at the end thereof and in the areas of the interlocked. Again, the objection with said finger joint is that it is not conveniently applied in structural design wherein a corner assembly is concerned. Furthermore, small members become flexibly weak and the joint is absolutely fragile for some reason that the effective joint shoulder is short and the effective glueing area is also small.

ADVANTAGES OF THE INVENTION

The present invention avoids the difficulties experienced in the design of prior known modular furniture and more on the design of the structural framework by providing a more simplified modular low-cost multi-purpose framework structurally designed introducing a novel corner assembly and a slanted finger joint for use therewith, that represents a complete departure from any design of modular furniture and also, in the design of furniture structural framework in general making both the joint and a comparably smaller structural members formed of wood very strong to take normal stresses.

As far as I am concerned this is so far the only modular furniture design basically formed of wood that is so simple in appearance, yet, its design possibilities are limitless; it is extremely versatile to suits varied application, very convenient and the cost is exceptionally very low; shipment by volume is also cheap and that the problem of wood due to change of climate condition is minimized; generally, it requires only simple and few number of equipment to fabricate and that the designed car easily adapted to suit a purely mechanized or either a combination of mechanized and a labor intensive manufacturing process.

OBJECTS OF THE INVENTION

Accordingly, the principal object of the present invention is to overcome the intricate problems encountered in the prior art and to provide a more simplified modular furniture employing a modular multi-purpose framework that is adaptable for vertical stacking and horizontal joining and also, with a means adapted to accommodate other related component parts or accessories, that is in general loosely held in place on said framework to allow an instant formation of different kind of modular and convertible furniture pieces generally even without the use of any tools.

Another object of this present invention is to provide modular multi-purpose framework structurally designed introducing a novel corner assembly and a slanted finger joint for use therewith.

Still another object of this present invention is to provide a very simple low cost framework fabricated out of comparably smaller frame members formed of good quality dress lumber, yet, very strong to take normal stresses.

BRIEF DESCRIPTION OF THE DRAWINGS

With those objects in view as well as other objects and advantages which will appear in the specification, reference will be had to the accompanying drawings which forms a part hereof, wherein:

FIG. 1 is an isometric drawing of the basic framework constructed in accordance with an forming part of the present invention and showing one of its inverted U-shaped sub-assembled frame member being detached;

FIG. 2 is a cross-sectional view taken along line 2—2 of FIG. 1;

FIG. 3 is an elevational view of FIG. 2;

FIG. 4 is a top view of FIG. 2;

FIG. 5 is a fragmentary isometric drawing of the novel corner assembly used in FIG. 1;

FIG. 6 is a top view of FIG. 5;

FIG. 7 is a fragmentary isometric drawing of the corner assembly as viewed from line 7—7 of FIG. 6;

FIG. 8 is an isometric drawing of a modified frame member alternately used in the construction of said framework FIG. 1;

FIG. 9 is a cross sectional view taken along line 9—9 of FIG. 8;

FIG. 10 is a top view of FIG. 9;

DETAILED DESCRIPTION OF PREFERRED EMBODIMENT

Figure 11:
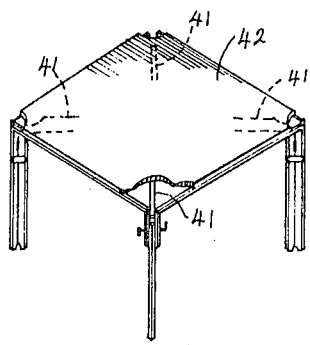
FIG. 11 illustrates, in isometric drawing a table with cut-away portion showing a means for holding in place the table top as supported on the framework embodied in FIG. 1.

Referring now more specifically to the drawing, there is shown in FIG. 1 a framework generally designated as A which basically consists of longitudinal sub-assembled frame members 10, 11; transverse-sub-assembled frame members 12, 13; and leg members 14 diagonally secured in between by said frame members. Said framework is fabricated from well-seasoned good quality dress lumber or mouldings. The said frame members 10, 11 and 12, 13 are generally formed into an inverted U-shaped configuration having downwardly extending vertical portions 10a, 11a, and 12a, 13a respectively.

The joint used between the horizontal and the vertical portions of said U-shaped frame members is that of a slanted finger type. Said joint is defined by interlocking end of the adjacent portions, laterally the wider face in contact of each portions is slanted with respect to each other and laterally having a predetermined matching slanted end, and being formed with plurality of fingers that are cut in the material from which said portion is formed, at the said end thereof and in the area of the interlock to develop a longer effective joint shoulder and a wider effective glueing area thereby affecting a stronger and practical joint. As best shown in FIGS. 2, 3 and 4 said joint is defined, by interlocking end 15 of the adjacent horizontal portion 10 and vertical portion 10a, laterally the wider face in contact 16 of portion 10 and 17 of portion 10a is slanted with respect to each other and laterally having a predetermined matching slanted end 18 of portion 10a and 19 of portion 10 and being formed with plurality interlocking fingers 20 and 21 that are cut in the material from which said portion is formed, at the said end thereof and in the area of the interlock to develop a longer effective joint shoulder 22 and a wider effective glueing area 23 thereby affecting a stronger and practical joint. Both said portions are longitudinally provided with oppositely optional disposed grooves 24 and each of said horizontal portions having a series of holes 25 formed thereon, the purpose of which will hereinafter be explained.

Adapting in combination the said slantedly sub-assembled U-shaped frame members it becomes now possible to provide a novel corner assembly by digonally securing the said leg member in between the vertical portion of the adjacent frame members and including a means to form a unitary strong corner assembly. The identical corner assembly is clearly shown in FIGS. 5, 6 and 7. As for a specific example, the frame members 11, 13 with the respective slanted disposed vertical portions 11a; 13a, diagonally secured in between the leg 14, then glued at the contacting surface to form a unitary structure. Preferably, a dowel 26 and a spline 27 disposed along the groove 24 is used in combination to improve further the strength of said assembly. A space or gap 28 is defined therebetween intended basically a means for vertical stacking. The thickness of the leg 14 is slightly tapered downward in proportion with the space 28 in order that the mode to stacking is made easily. The upper end of said leg member is further provided with a tongue 29 and at the lower end is formed with matching groove 30 such that the tongue and groove combination provide a perfect vertical stacking or formation wherein the toe 31 of the typical stacking framework rest on the shoulder 32 of the supporting framework. The inner portion 33 of the upper end of said leg members is further cut downwardly beyond the level of the shoulder 32, the detail of which will hereinafter be explained. Provided as the vertical portions 11a, 13a are the respective hook 34, 35, the hooking positions of which are oppositely directed such that when the plurality of framework A is horizontally joined, a pair of hook members, one that is directed upwardly and the other that is directed downwardly, will be matched together.

Figure 12:
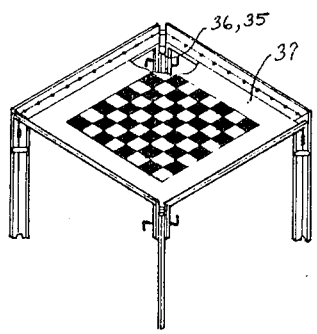
FIG. 12 illustrates in isometric drawing a chess table with cut-away portion showing a means for supporting a holding a chess board on the framework of FIG. 1.
Figure 13:
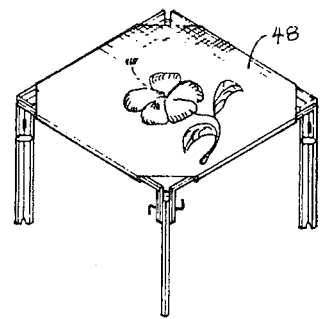
FIG. 13 illustrates in isometric drawing a stool with embroidered canvas seat secured on the frame members of FIG. 1.
Figure 14:
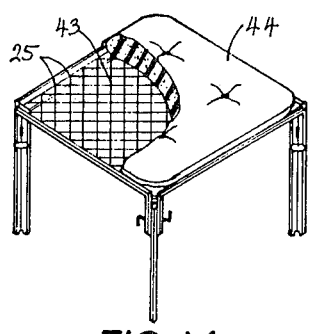
FIG. 14 illustrates in isometric drawing a stool with a cut-away cushion showing a wooven seat support using a suitable twine or nylon chords secured through the holes of the frame members of the framework of FIG. 1.
Figure 15:
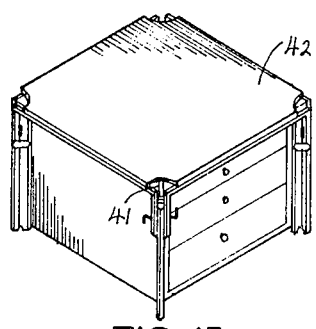
FIG. 15 illustrates in isometric drawing a table with chest of drawers formed on the framework of FIG. 1.
Figure 16:
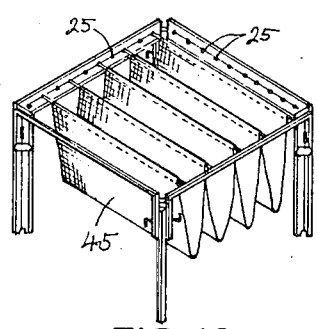
FIG. 16 illustrates in isometric drawing a magazine rack supported on the framework of FIG. 1.
Figure 17A:
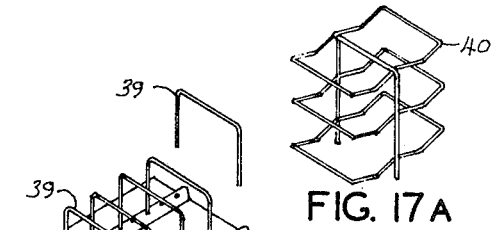
FIG. 17A illustrates in isometric drawing a battle rack adapted to be alternately mounted on the base plate of the record rack of FIG. 17.
Figure 17:
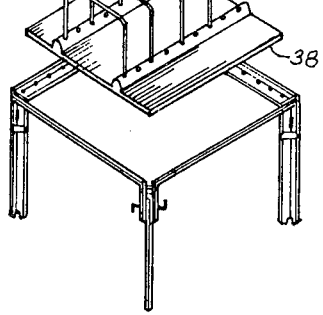
FIG. 17 illustrates in exploded isometric drawing a record rack supporting and holding a base plate on the framework of FIG. 1.
Figure 18:
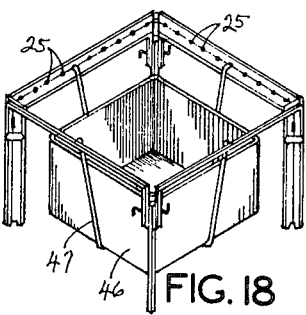
FIG. 18 illustrates in isometric drawing a planter box supported on the framework of FIG. 1.
Figure 19:
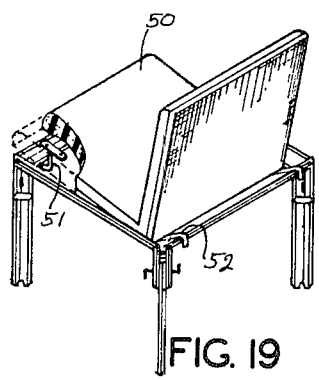
FIG. 19 illustrates in isometric drawing a chair with a cut-away seat insertably mounted on the framework of FIG. 1.

The cross-sectional profile of the said frame members and leg members are preferably identical. Said frame members could be of any geometrical cross sectional profile provided that its major axis is no less than twice its corresponding minor axis, however, an elongated hexagonal cross sectional profile is most preferable. As shown in FIG. 2, the elongated hexagonal cross-section is such that the side 16, 16' are made symmetrical at the end side 36, 36' also symmetrically converges outwardly and merge to a point on the axis x—x. As clearly shown in FIG. 6, the projection defined by the side 36 or the space 33, as previously stated, serves as a supporting means when a related loosely attached component as in the chessboard 37 or the like FIG. 12; or a base plate 38 to support a record rack 39 or a bottle rack 40 or the like FIG. 17 is supported within the confined of said framework A. Furthermore, the said inner portion 33 FIG. 7 is formed in such a way to provide enough room for the stopper 41 which is secured underneath the table top 42, FIGS. 11, 15. The holes 25 as previously stated provide for weaving a suitable twine or nylon chord 43 or the like as in FIG. 14 and that it serves as a seat or to support a cushion 44; or a means to support a magazine rack 45 as in FIG. 16; and a planter box 46 as in FIG. 18 by the use of a metal rod hanger 47. Going back to FIG. 13 is shown a stool with an embroidered canvas seat 48 supported on said framework A. The horizontal portion of said frame members 10, 11 and 12, 13 are partly resect 49 in proportions to the thickness and coverage of the said canvas seat so that the horizontal joining of the said framework A does not interfere. A chain 50 could also be supported by said framework A by providing underneath thereof with a U-shaped bracket 51 which is secured underneath the seat insertably locked the chair into the front frame member and a rear bracket 52 resting on the rear frame member.

Alternative to the frame member of said framework FIG. 1, is a modified frame member as shown in FIGS. 8, 9, and 10, consisting of the modified horizontal portion 53 and the vertical portions 53a (FIG. 8) form into an inverted U-shaped configuration sub-assembled frame member by means of interlocking fingers 54 of portion 53 and fingers 55 of portion 53a (FIG. 10) forming thereon a modified slanted finger joint. Said modified finger joint is defined by interlocking end of the horizontal portion and the vertical portion, laterally the face in contact 56 of the modified horizontal portion is at right angle with respect to the adjacent portion 53a and laterally having a predetermined matching slanted end 57; and a vertical portion having a predetermined matching end disposed on said slanted end of said horizontal portion and being formed with plurality of fingers that are cut in the material frame which said portion is formed at the said end thereof and in the area of the interlock; to develop a longer effective joint shoulder 58 and a wider effective glueing area 59 thereby effecting a stronger modified joint.

With the aforementioned interrelated and interchangeable components parts and accessories being loosely formed on said framework A, several lay-outs and arrangements or combinations could be made instantly possible for sitting, sleeping, dining, storage, platform, merchandizing display or others easily and efficiently generally even without the use of any tool.

It is believed that the invention has been described in such detail as to enable those skilled in the arts to understand the same and it will be appreciated that variations or modifications may be without departing from the spirit and scope of the invention.

What is claimed and desired to be secured by letters patent is:

1. A modular multi-purpose furniture framework comprising four identical inverted U-shaped frame members each of which includes an elongated cross member and a pair of depending end members having oppositely bevelled faces, said cross member and each of said end members being comprised of elongated flat boards with each of said end members being connected to the cross member by means of bevelled mitered finger joints, four elongated leg members having parallel flat faces with each of said leg members being secured between opposed surfaces of adjacent end members whereby said cross members will define a rectangular frame having a depending leg member at each corner.

2. A modular multi-purpose furniture framework as set forth in claim 1 wherein said cross members each have a rectangular cross-section.

3. A modular multi-purpose furniture framework as set forth in claim 1 wherein each of said cross members, end members and leg members is provided with a longitudinal groove in the opposite major surfaces thereof and further comprising spline means disposed in opposed grooves of said end members and said leg members to strengthen the connection therebetween.

4. A modular multi-purpose furniture framework as set forth in claim 1 wherein each leg member is provided with a notch in one end and a complementary longitudinal projection on the other end which is disposed in spaced relation to the joints between said end members and cross members to provide an interfitting connection between leg members when said framework is vertically stacked on an identical framework.

5. A modular multi-purpose furniture framework as set forth in claim 1 further comprising a pair of oppositely directed hook members secured to the depending end members at each corner of said framework with the ends thereof protruding beyond the perimeter of the rectangular frame for engagement with similar hooks on an adjacent identical framework to hold said frameworks in contiguous relation to each other.

6. A modular multi-purpose furniture framework as set forth in claim 1 wherein each of said cross members is provided with a plurality of spaced apart holes disposed in line along the length thereof.

7. A modular multi-purpose furniture framework as set forth in claim 4 wherein the projection on the end of each leg is spaced inwardly from the longitudinal edges of the leg to define a shoulder at the upper end of the leg between opposing end members for the reception of structural means adapted to be supported by said framework.

* * * * *